United States Patent
Lobban et al.

(10) Patent No.: US 11,750,575 B2
(45) Date of Patent: Sep. 5, 2023

(54) SYSTEMS AND METHODS FOR GATEWAY COMMUNICATIONS FOR DISTRIBUTED LEDGER SYSTEMS

(71) Applicant: JPMORGAN CHASE BANK, N.A., New York, NY (US)

(72) Inventors: Tyrone Lobban, London (GB); Christine Moy, New York, NY (US); Tulasi Movva, Trumbul, CT (US); Suresh Shetty, Monmouth Junction, NJ (US); Debidutta Pruthibiraj Samantaray, Singapore (SG); Raunak Rajpuria, Singapore (SG); You Zhou, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 434 days.

(21) Appl. No.: 17/124,204

(22) Filed: Dec. 16, 2020

(65) Prior Publication Data
US 2021/0185021 A1    Jun. 17, 2021

Related U.S. Application Data

(60) Provisional application No. 62/948,702, filed on Dec. 16, 2019.

(51) Int. Cl.
*G06F 16/27*    (2019.01)
*H04L 9/40*    (2022.01)
(Continued)

(52) U.S. Cl.
CPC .......... *H04L 63/0428* (2013.01); *G06F 9/541* (2013.01); *G06F 9/546* (2013.01);
(Continued)

(58) Field of Classification Search
CPC ... H04L 63/0428; H04L 9/3213; G06F 16/27; G06F 9/541; G06F 9/546; G06F 9/547
(Continued)

(56) References Cited

U.S. PATENT DOCUMENTS

2018/0121911 A1 * 5/2018 Hallam .................. G06F 16/27
2018/0375840 A1   12/2018 Moy et al.
(Continued)

OTHER PUBLICATIONS

International Search Report, dated Mar. 23, 2021, from corresponding International Application No. PCT/US2020/065391.
(Continued)

*Primary Examiner* — Thanh T Le
(74) *Attorney, Agent, or Firm* — GREENBERG TRAURIG LLP

(57) ABSTRACT

Systems and methods for gateway communications between non-distributed ledger systems and distributed ledger systems are disclosed. In one embodiment, a method for gateway communication may include: (1) receiving, at a listener comprising a computer processor and from an application in a first domain, a message for a destination distributed ledger system that is one of a plurality of distributed ledger systems in a second domain; (2) generating, by the listener, a payload for the message, wherein the payload identifies the destination distributed ledger system for the message; and (3) encrypting, by the listener, the payload and passing a payload message comprising the encrypted payload to one of a plurality of adapters in a gateway communication service using an API. The adapter may receive the payload message, decrypt the payload, identifies the destination distributed ledger system, and communicate the decrypted payload to the destination distributed ledger system.

16 Claims, 3 Drawing Sheets

(51) Int. Cl.
  *G06F 9/54* (2006.01)
  *H04L 9/32* (2006.01)
(52) U.S. Cl.
  CPC .............. *G06F 9/547* (2013.01); *G06F 16/27* (2019.01); *H04L 9/3213* (2013.01)
(58) Field of Classification Search
  USPC ........................................................ 713/159
  See application file for complete search history.

(56) References Cited

U.S. PATENT DOCUMENTS

| | | | | |
|---|---|---|---|---|
| 2020/0117733 | A1* | 4/2020 | Mueller | H04L 9/0637 |
| 2020/0118120 | A1* | 4/2020 | Hing | H04L 9/3239 |
| 2020/0213331 | A1* | 7/2020 | Li | H04L 63/0428 |
| 2020/0344132 | A1* | 10/2020 | Padmanabhan | H04L 41/22 |
| 2020/0349564 | A1* | 11/2020 | Padmanabhan | H04L 63/123 |
| 2020/0380520 | A1* | 12/2020 | Kavali | G06Q 20/02 |
| 2020/0401573 | A1* | 12/2020 | Coleman | G06F 16/275 |
| 2022/0053064 | A1* | 2/2022 | Carley | H04L 67/562 |

OTHER PUBLICATIONS

Written Opinion of the International Searching Authority, dated Mar. 23, 2021, from corresponding International Application No. PCT/US2020/065391.

Jin, Hai; et al; Towards a Novel Architecture for Enabling Interoperability amongst Multiple Blockchains, 2018 IEEE 38th International Conference on Distributed Computing Systems (ICDCS), IEEE, Jul. 2, 2018 (Jul. 2, 2018), pp. 1203-1211.

Herlihy, Maurice; et al.; Cross-chain deals and adversarial commerce, Roceedings of the VLDB Endowment; [ACM Digital Library], Assoc. of Computing Machinery, New York, NY, vol. 13. No. 2, Oct. 1, 2019 (Oct. 1, 2019), pp. 100-113.

* cited by examiner

SYSTEMS AND METHODS FOR GATEWAY COMMUNICATIONS FOR DISTRIBUTED LEDGER SYSTEMS

RELATED APPLICATIONS

This application claims priority to, and the benefit of, U.S. Provisional Patent Application Ser. No. 62/948,702, filed Dec. 16, 2019, the disclosure of which is hereby incorporated, by reference, in its entirety.

BACKGROUND OF THE INVENTION

1. Field of the Invention

The present disclosure generally relates to systems and methods for gateway communications with distributed ledger systems.

2. Description of Related Art

Distributed ledger systems, such as Blockchain-based systems, are increasingly being implemented by different providers. There are different types of systems, and it is difficult for one system to communicate with another, or with legacy (e.g., non-Blockchain based systems).

SUMMARY OF THE INVENTION

Systems and methods for gateway communications for distributed ledger systems are disclosed. In one embodiment, a method for gateway communication between a non-distributed ledger system and a distributed ledger system may include: (1) receiving, at a listener comprising a computer processor and from an application in a first domain, a message for a destination distributed ledger system that may be one of a plurality of distributed ledger systems in a second domain; (2) generating, by the listener, a payload for the message, wherein the payload identifies the destination distributed ledger system for the message; and (3) encrypting, by the listener, the payload and passing a payload message comprising the encrypted payload to one of a plurality of adapters in a gateway communication service using an API. The adapter may receive the payload message, decrypt the payload, identify the destination distributed ledger system, and communicate the decrypted payload to the destination distributed ledger system.

In one embodiment, the message may include a request to tokenize an asset having a plurality of attributes, and the method may further include tokenizing, by the listener, the plurality of attributes for the asset. The payload may include the tokenized plurality of attributes for the asset.

In one embodiment, the payload may also identify a distributed ledger technology for the destination distributed ledger system, and the method may further include the adapter translating the decrypted payload to a format for the distributed ledger technology and communicating the translated decrypted payload to the destination distributed ledger system.

In one embodiment, the method may further include signing, by the listener, the encrypted payload.

In one embodiment, the payload message may include an identifier for the adapter.

In one embodiment, the adapter may be associated with the destination distributed ledger system.

According to another embodiment, a method for gateway communication between a non-distributed ledger system and a distributed ledger system may include: (1) receiving, at one of a plurality of adapters in a gateway communication service in a second domain comprising a computer processor, a payload message comprising an encrypted payload, the payload from an application in a first domain and encrypted by a listener and for a destination distributed ledger system that may be one of a plurality of distributed ledgers system in the second domain; (2) decrypting, by the adapter, the payload; (3) identifying, by the adapter, the destination distributed ledger system from the decrypted payload; and (4) communicating the decrypted payload to the destination distributed ledger system.

In one embodiment, the payload may include a tokenized plurality of attributes for an asset.

In one embodiment, the payload may identify a distributed ledger technology for the destination distributed ledger system, and the method may further include the adapter translating the decrypted payload to a format for the distributed ledger technology and communicating the translated decrypted payload to the destination distributed ledger system.

In one embodiment, the encrypted payload may be signed by the listener.

In one embodiment, the payload message may include an identifier for the adapter.

In one embodiment, the adapter may be associated with the destination distributed ledger system.

According to another embodiment, a method for gateway communication between a distributed ledger system and a non-distributed ledger system may include: (1) receiving, at one of a plurality of adapters in a gateway communication service in a second domain comprising a computer processor, a message for an application in a first domain from one of a plurality of a distributed ledger systems; (2) translating, by the adapter, the message from a format for the distributed ledger system to a format for the application; (3) encrypting, by the adapter, the translated message; (4) generating, by the adapter, a payload for the translated message; (5) generating, by the adapter, a payload message comprising the encrypted payload; and (6) communicating the payload message to a listener associated with the application in the first domain using an API. The listener decrypts the payload and provides the decrypted payload to the application.

In one embodiment, the step of communicating the payload message to a listener associated with the application in the first domain may include the adapter pushing the payload message to the listener.

In one embodiment, the step of communicating the payload message to a listener associated with the application in the first domain may include the listener pulling the payload message from the adapter in response to the listener polling the adapter.

In one embodiment, the payload message may identify the listener.

In one embodiment, the listener may be associated with the application.

In one embodiment, the method may further include signing, by the adapter, the encrypted payload.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
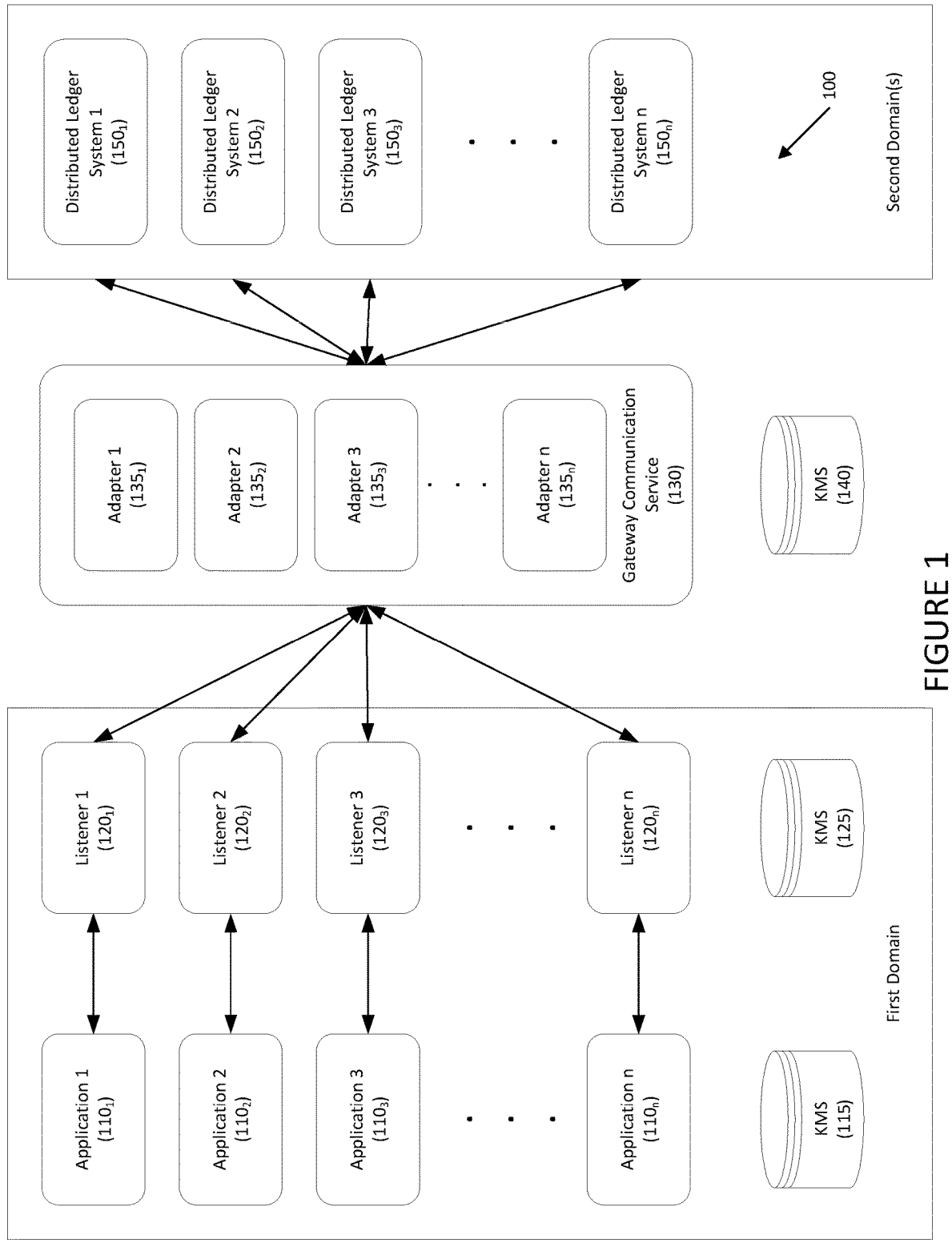
FIG. 1 depicts a system for gateway communications for distributed ledger systems according to one embodiment.

The disclosures of U.S. Provisional Patent Application Ser. 62/525,600 and U.S. patent application Ser. No. 16/020,473 are hereby incorporated, by reference, in their entities.

Embodiments are generally directed to systems and methods for gateway communications for distributed ledger systems. In one embodiment, a gateway may provide access through an organizational firewall, and all communications to and from the organization may flow through the gateway. For example, each backend system (e.g., distributed ledger systems, databases, etc.) may be provided with an adapter that facilitates communication with the gateway so that the gateway and route incoming communications to the appropriate backend system, and can route outgoing communications from, the backend system.

Embodiments may allow representation of existing financial instruments (including cash, fixed income, other debt securities), and other asset types, via the gateway which relate events handled on existing internal systems to creation and destruction of tokens on distributed ledger platforms.

Although the term "distributed ledger" is used herein, it should be recognized that this may include any suitable distributed ledger that provides an immutable, cryptographically-verifiable record.

Embodiments may provide a "tokenization service" that may be responsible for the creation of a "tokenization certificate"—cryptographic evidence of an event from an internal system. This payload may be signed (only the source system could have created it; non-repudiation) and encrypted (only the intended destination can read it; security, spoofing prevention).

Examples of events may include the movement of cash between accounts, a notification of collateral movement via, for example, a SWIFT MT569 message, the movement, exchange, trade, etc. of investment vehicles, securities, renewable energy credits, carbon credits, etc., the "digitization" of tangible assets, such as precious metals, vehicles, objects, artwork, etc. Any other suitable event may be included as is necessary and/or desired.

An example of the movement of a renewable energy credit is disclosed in U.S. patent application Ser. No. 17/087,337 filed Nov. 2, 2020, the disclosure of which is hereby incorporated, by reference, in its entirety.

The payload may be delivered via a gateway, which may be a mechanism that connects internal messages with externally hosted distributed ledger platforms. The gateway may coordinate internal and external message brokers, and may communicate exclusively over an egress-only "bridge" proxy component. In one embodiment, the gateway may connect non-distributed ledger internal/external systems with one or more distributed ledger platforms through a single, secured API.

In one embodiment, the gateway may provide at least some of the following: message signing, non-repudiation, guaranteed delivery, failure management, key management, high availability, transaction receipt delivery, transaction receipt replay, and event delivery.

Referring to FIG. 1, a system for gateway communications between distributed ledger systems and non-distributed ledger systems is disclosed according to another embodiment. System 100 may include applications $110_1$, $110_2$, $110_3$, . . . $110_n$. Each application 110 may be associated with one or more asset type, such as cash, cash, collateral, securities, precious metals, vehicles, objects, energy credits, etc. Other asset types may be included as is necessary and/or desired.

In embodiments, application 110 may be a system that holds relevant information about the asset, such as the asset type, identification of the of the holder, etc.

Each application 110 may be executed by one or more computing devices, such as computers, servers (physical and/or cloud-based), etc. In one embodiment, applications 110 may be in a first domain, such as a business domain for an organization, financial institution, FinTech, etc.

System 100 may further include a plurality of listeners $120_1$, $120_2$, $120_3$, . . . $120_n$. Each listener 120 may be associated with one or more application 110, and may receive messages from one or more application 110. In one embodiment, listeners 120 may convert application-specific messages from application 110 into a generic payload to be communicated to one or more distributed ledger system $150_1$, $150_2$, $150_3$, . . . $150_n$ via an adapter 135 in gateway communication service 130. It may further convert a generic payload received from one or more distributed ledger system $150_1$, $150_2$, $150_3$, . . . $150_n$ via gateway communication service 130 into an application-specific message for one of application 110.

Each listener 120 may also encrypt and digitally sign outgoing generic payloads, which may provide authenticity and non-repudiation.

Listeners 120 may provide tokenization services for one or more type of asset (e.g., cash tokenization, collateral tokenization, securities tokenization, precious metal tokenization, vehicle tokenization, object tokenization, energy credit tokenization, etc.), and may create and sign a message reflecting the event (e.g., a business domain event) with sub-certificate establishing link to root of trust to the specific domain in which the event is generated. Thus, listeners 120 may tokenize and issue asset-backed tokens in a trusted, verifiable way.

Listeners 120 may further provide reporting capabilities statistics and information on token usage.

In one embodiment, each listener 120 may be a computer program that is executed by one or more computing devices, such as computers, servers (physical and/or cloud-based), etc.

In one embodiment, applications $110_1$, $110_2$, $110_3$, . . . $110_n$ and listeners $120_1$, $120_2$, $120_3$, . . . $120_n$ may be internal to a domain, such as a business domain, a business entity, etc.

Gateway communication service 130 may provide a highly available, reliable messaging layer. It may provide translation between a domain (e.g., the domain for one or more application 110 and listener 120) and one or more distributed ledger system (e.g., one or more distributed ledger 150). Gateway communication service 130 may include a plurality of adapters $135_1$, $135_2$, $135_3$, . . . $135_n$ that may receive the payload from one listener 120, decrypt the payload, and translate it for the destination distributed ledger system 150, and write it to the distributed ledger system 150.

For example, in one embodiment, a message from one of applications 110 may include an identification of a platform (e.g., a specific distributed ledger technology) and a destination distributed ledger system (e.g., one of distributed ledger systems 150). The message (e.g., a header portion) may further identify one of the adapters 135 to process the message. The identified adapter 135 may identify the destination distributed ledger system 150 from the message.

Similarly, a message from one of the distributed ledger systems 150 may identify a specific application 110 that is to receive the message.

Adapters 135 may also receive a message (e.g., a confirmation message) from distributed ledger system 150, convert it to a generic payload, and communicate it to application 110.

In embodiment, each listener 120 may poll one or more adapter $135_1, 135_2, 135_3, \ldots 135_n$ for a message from one or more distributed ledger system $150_1, 150_2, 150_3, \ldots 150_n$ for a specific application 110. In another embodiment, each listener 120 may receive messages from one or more distributed ledger system $150_1, 150_2, 150_3, \ldots 150_k$ via more adapter $135_1, 135_2, 135_3, \ldots 135_n$ for a specific application 110. The messages may include any sort of suitable message regarding the asset associated with application 110, including confirmation messages.

An example adapter 135 is a cash/collateral adapter. Such an adapter 135 may verify the authenticity of cash and collateral events using, for example digital signatures. It may further transform cash and collateral events to other types of transactions as is necessary and/or desired.

Gateway communication service 130 may also provide several services, such as verification and non-repudiation checks, data filtering, enrichment, and/or transformation, and distributed ledger system integration.

In one embodiment, gateway communication service 130 may be executed one or more servers (physical and/or cloud).

In embodiments, key management services (KMS) 115, 125, and 140 may be provided. Applications 110, listeners 120, and gateway communication service 130 may communicate with respective KMS 115, 125, 150 which may store keys that may be used to sign messages and distributed ledger transactions, perform other cryptographic operations, etc.

Distributed ledger system $150_1, 150_2, 150_3, \ldots 150_n$ may be any suitable distributed ledger system, using any suitable technology. In embodiments, one or more distributed ledger system may be in a second domain that is different from the first domain. A plurality of second domains may be provided as is necessary and/or desired.

In embodiments, the producers of the data and the consumers of that data (e.g., applications 110 and distributed ledger systems 150, or vice-versa), are agnostic to each other. Thus, gateway communication service 130 provides an interface, or bridge, for routing the payload from applications 110 to distributed ledger system 150, and from distributed ledger system 150 to application 110, and the adapters translate the payload as is necessary.

Figure 2:
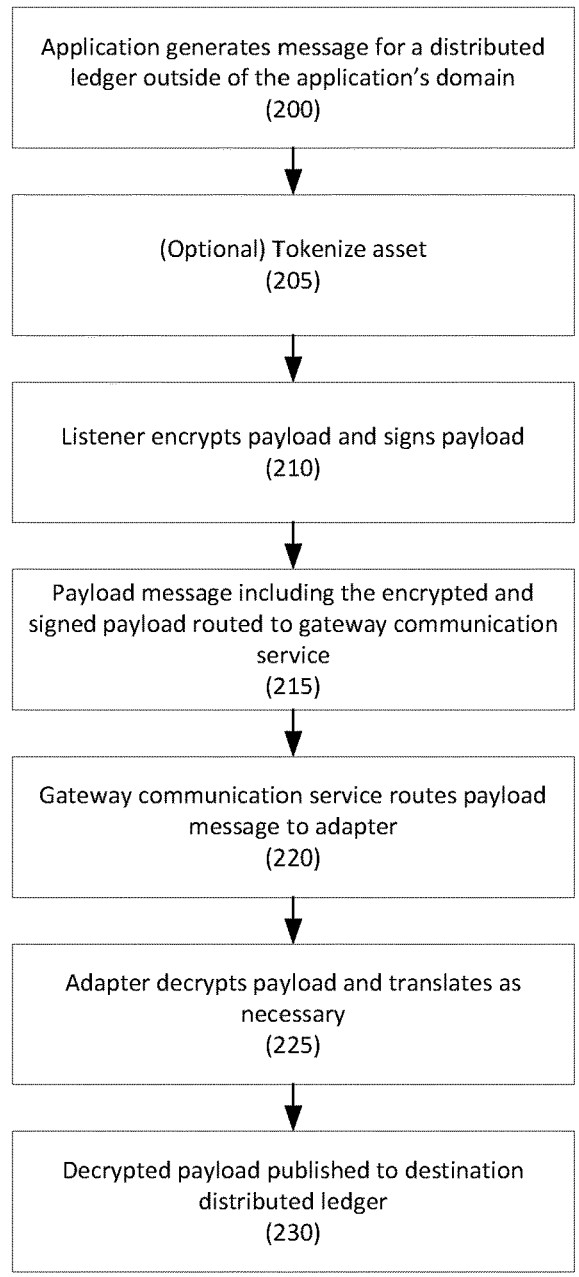
FIG. 2 depicts a system for gateway communications for distributed ledger systems according to one embodiment.

Referring to FIG. 2, a method for gateway communications between distributed ledger systems and non-distributed ledger systems is disclosed according to another embodiment.

In step 200, an application may generate a message for a distributed ledger system that is outside of its domain (e.g., outside of a business domain). In one embodiment, the message may be related to an asset associated with an application.

In one embodiment, the message may include a request to tokenize, or digitize, an asset. In step 205, an asset may optionally be tokenized. For example, an asset may be tokenized by taking a set of attributes for the asset and creating a payload representing the asset.

Examples of tokenization processes are disclosed in U.S. Provisional Patent Application Ser. No. 62/757,614, U.S. patent application Ser. No. 16/677,609, U.S. Provisional Patent Application Ser. No. 63/022,827, and U.S. patent application Ser. No. 16/878,457, the disclosures of each of is each hereby incorporated, by reference, in its entirety.

In step 210, the listener may generate a payload for the message received from the application. In one embodiment, the payload may identify a destination distributed ledger system and may optionally identify the distributed ledger technology. In another embodiment, the specific type of distributed ledger system, destination, etc. may not be identified in the message.

In one embodiment, the listener may encrypt and sign the payload. In one embodiment, the payload may be encrypted with a first key, and then the payload and first key may be encrypted with a second key.

In step 215, a payload message including the encrypted and signed payload may be provided to the gateway communication service using, for example, a standardized generic message that can accept any payload message, passed to a predefined, standardized API, which, in step 220, may route the payload message to an adapter. In one embodiment, the payload message may identify a specific adapter to receive the payload.

In step 225, the adapter may decrypt the payload from the payload message and may identify the destination distributed ledger system and the distributed ledger technology, if provided. The adapter may then translate the payload as necessary for the format of the destination distributed ledger technology as is necessary and/or desired.

In step 230, the adapter may send the translated payload to the appropriate destination distributed ledger system, wherein it may be written.

Figure 3:
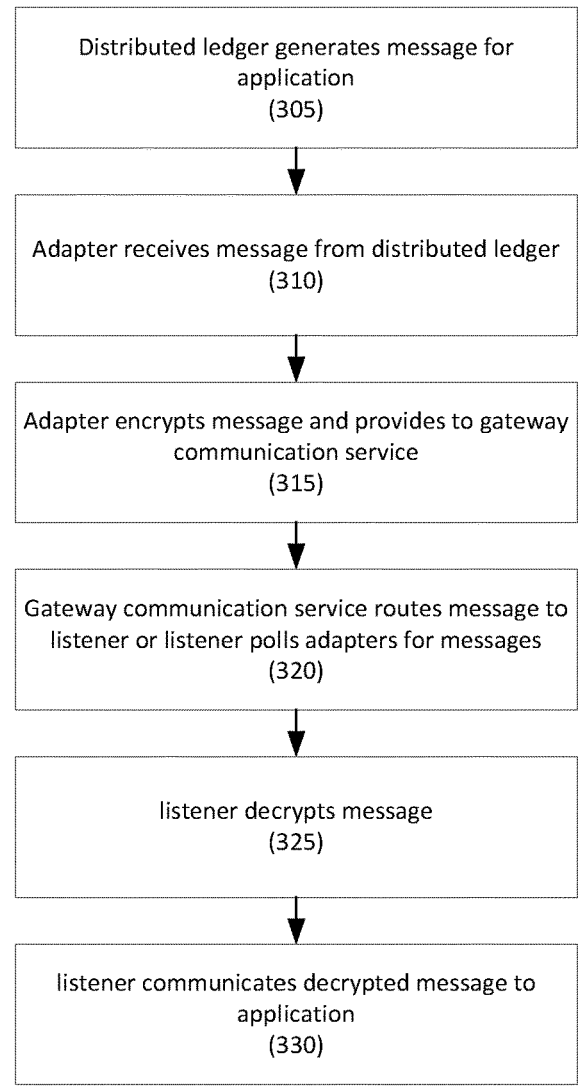
FIG. 3 depicts a system for gateway communications for distributed ledger systems according to another embodiment.

Referring to FIG. 3, a method for gateway communications between distributed ledger systems and non-distributed ledger systems is disclosed according to another embodiment.

In step 305, a distributed ledger system may originate a message for one of the applications in the other domain. For example, the message may be any suitable message, including confirmation messages, messages about an asset, etc.

In step 310, an adapter may receive the message from the distributed ledger system. In one embodiment, the adapter may translate the message from the distributed ledger system format to a format for the application as is necessary and/or desired.

In one embodiment, the adapter may encrypt the message. For example, the message may be encrypted with a first key, and then the first key and the message may be encrypted using a second key.

In one embodiment, the message may identify a specific listener in a different domain to receive the message.

In step 315, the adapter may provide the message to the gateway communication service, which may then provide the message to a listener (e.g., push). Alternately, a listener may poll the adapters for messages for its application and may retrieve (e.g., pull) the message via the gateway communication service.

In step 320, the gateway communication service may communicate the message to a listener in the domain.

In step 325, the listener may decrypt the message and, in step 330, may provide the decrypted message to the application. The application may then consume the message as is necessary and/or desired.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for gateway communication between a non-distributed ledger system and a distributed ledger system, comprising:
   receiving, at a listener comprising a computer processor and from an application in a first domain, a message for a destination distributed ledger system that is one of a plurality of distributed ledger systems in a second domain;
   generating, by the listener, a payload for the message, wherein the payload identifies the destination distributed ledger system for the message and identifies a distributed ledger technology for the destination distributed ledger system; and
   encrypting, by the listener, the payload and passing a payload message comprising the encrypted payload to one of a plurality of adapters in a gateway communication service using an API;
   wherein the adapter receives the payload message, decrypts the payload, identifies the destination distributed ledger system, translates the decrypted payload to a format for the distributed ledger technology, and communicates the translated decrypted payload to the destination distributed ledger system.

2. The method of claim 1, wherein the message comprises a request to tokenize an asset having a plurality of attributes, and the method further comprises:
   tokenizing, by the listener, the plurality of attributes for the asset;
   wherein the payload comprises the tokenized plurality of attributes for the asset.

3. The method of claim 1, further comprising:
   signing, by the listener, the encrypted payload.

4. The method of claim 1, wherein the payload message comprises an identifier for the adapter.

5. The method of claim 1, wherein the adapter is associated with the destination distributed ledger system.

6. A method for gateway communication between a non-distributed ledger system and a distributed ledger system, comprising:
- receiving, at one of a plurality of adapters in a gateway communication service in a second domain comprising a computer processor, a payload message comprising an encrypted payload, the payload from an application in a first domain and encrypted by a listener and for a destination distributed ledger system that is one of a plurality of distributed ledgers system in the second domain, wherein the payload further identifies a distributed ledger technology for the destination distributed ledger system;
- decrypting, by the adapter, the payload;
- identifying, by the adapter, the destination distributed ledger system from the decrypted payload;
- translating, by the adapter, the decrypted payload to a format for the distributed ledger technology; and
- communicating the translated decrypted payload to the destination distributed ledger system.

7. The method of claim 6, wherein the payload comprises a tokenized plurality of attributes for an asset.

8. The method of claim 6, wherein the encrypted payload is signed by the listener.

9. The method of claim 6, wherein the payload message comprises an identifier for the adapter.

10. The method of claim 6, wherein the adapter is associated with the destination distributed ledger system.

11. A method for gateway communication between a distributed ledger system and a non-distributed ledger system, comprising:
- receiving, at one of a plurality of adapters in a gateway communication service in a second domain comprising a computer processor, a message for an application in a first domain from one of a plurality of a distributed ledger systems;
- translating, by the adapter, the message from a format for the distributed ledger system to a format for the application;
- encrypting, by the adapter, the translated message;
- generating, by the adapter, a payload for the translated message;
- generating, by the adapter, a payload message comprising the encrypted payload; and
- communicating the payload message to a listener associated with the application in the first domain using an API;
- wherein the listener decrypts the payload and provides the decrypted payload to the application.

12. The method of claim 11, wherein the step of communicating the payload message to a listener associated with the application in the first domain comprises the adapter pushing the payload message to the listener.

13. The method of claim 11, wherein the step of communicating the payload message to a listener associated with the application in the first domain comprises the listener pulling the payload message from the adapter in response to the listener polling the adapter.

14. The method of claim 11, wherein the payload message identifies the listener.

15. The method of claim 11, wherein the listener is associated with the application.

16. The method of claim 11, further comprising:
signing, by the adapter, the encrypted payload.

* * * * *